United States Patent

[11] 3,532,193

| [72] | Inventor | Felix Kaiser<br>Oberursel, Germany |
|---|---|---|
| [21] | Appl. No. | 718,500 |
| [22] | Filed | April 3, 1968 |
| [45] | Patented | Oct. 6, 1970 |
| [73] | Assignee | Alfred Teves G.m.b.H.,<br>Frankfurt am Main, Germany<br>a corporation of Germany |
| [32] | Priority | April 13, 1967 |
| [33] | | Germany |
| [31] | | T 33,649 |

[54] DUO-DUPLEX INTERNAL EXPANSION BRAKE
10 Claims, 6 Drawing Figs.

[52] U.S. Cl. ..................................... 188/79.5,
188/196
[51] Int. Cl. ..................................... F16d 51/50,
F16d 65/56

[50] Field of Search ........................................... 188/79.5
(ALL), 196(RR)

[56] References Cited
UNITED STATES PATENTS

| 2,049,628 | 8/1936 | Rowland et al. | 188/79.5(K)UX |
| 3,131,787 | 5/1964 | Swift | 188/196(RR)UX |
| 3,189,131 | 6/1965 | Price | 188/79.5(P)UX |

Primary Examiner—Duane A. Reger
Attorney—Karl F. Ross

ABSTRACT: A force-transmitting member for duo-duplex internal expansion brakes wherein individually effective wear-compensating assemblies are provided between the pressure-transmitting member of each brake-shoe and a force-transmitting lever which, upon swinging movement in opposite senses adjusts one or the other brakeshoe to compensate for wear.

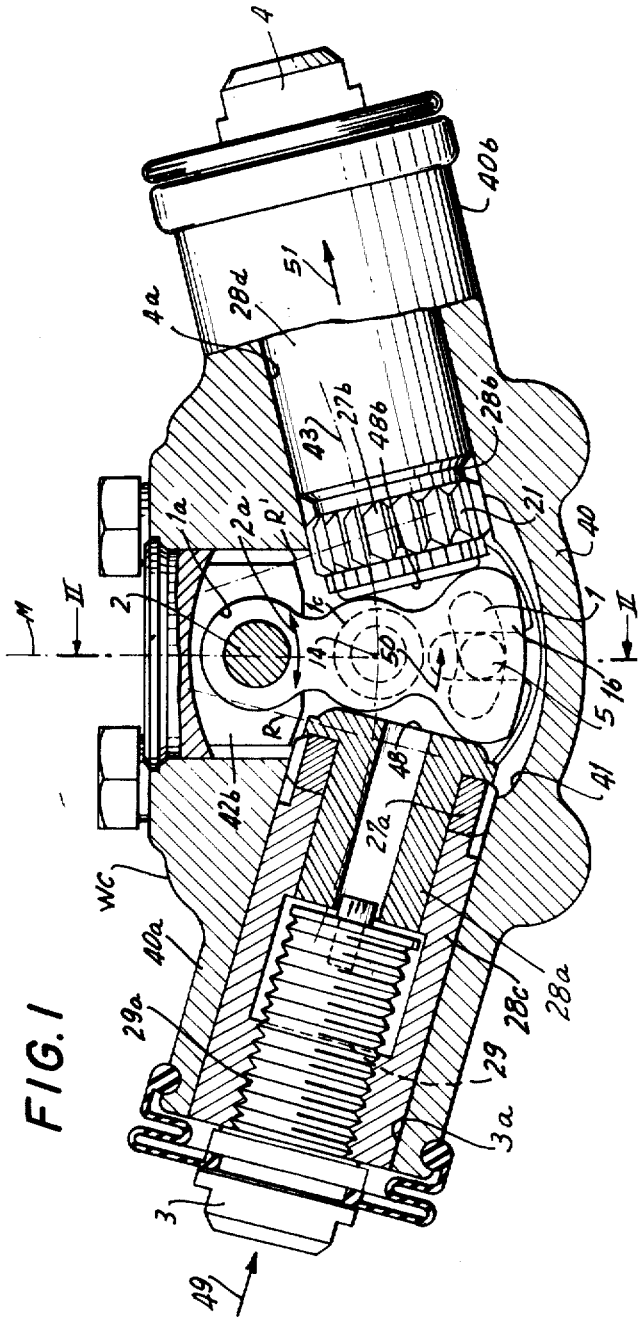
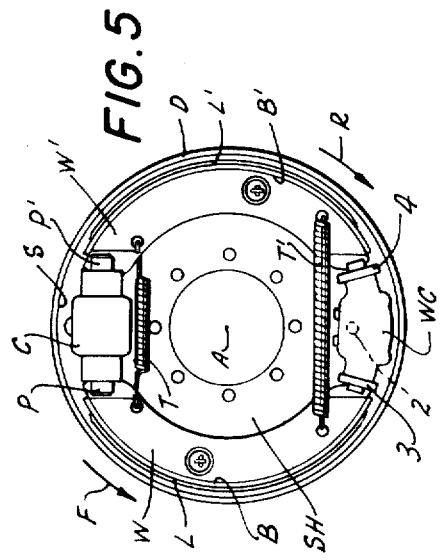

DUO-DUPLEX INTERNAL EXPANSION BRAKE

My present invention relates to a duo-duplex internal-expansion brake for automotive vehicles and, more particularly, to a force-transmitting assembly for such brakes.

While a number of internal-expansion brake constructions have been proposed heretofore, they generally have in common a brake shield lying in a plane perpendicular to the axis of rotation of a brake drum whose internal cylindrical surface is engageable by a pair of sectoral brakeshoes urged outwardly by one or more wheel-brake cylinders mounted upon the brake shield. In duplex-type brakes, at least one and generally two wheel-brake cylinders are provided to urge the respective brakeshoes outwardly against the force of tension springs drawing them inwardly. According to various proposals, the brakeshoes may be coupled remote from the cylinder by a force-transmitting lever which, when the so-called primary brakeshoe is entrained by the drum, transfers force to the end of the secondary brakeshoe remote from the wheel brake cylinder to apply the secondary brakeshoe against the drum with increased force.

Prior art arrangements of this nature have, to a large measure, been impractical because of the complex wear-compensating mechanisms necessary for adjustment of the positions of the brakeshoes with wear of the brake linings, the fact that these mechanisms were incapable of compensating for nonuniform wear of the primary and secondary shoes, and the problems involved in contamination of the complex lever mechanisms hitherto necessary.

It is, therefore, the principal object of the present invention to provide an improved force-transmitting mechanism between brakeshoes of an internal-expansion brake which is protected against contamination, is effective to compensate even for nonuniform lining wear and is of relatively simple construction.

This object and others which will become apparent hereinafter, are attainable, in accordance with the present invention, through the provision of a force-transmitting mechanism between the ends of the brakeshoes of an internal-expansion brake which has, in a sealed housing, a pair of diverging tubular extremities opening in the direction of the brakeshoes and slidably receiving force-transmitting variable-length wear-compensating mechanisms which rest against a dumbbell-shaped lever swingable about a fulcrum axis parallel to the axis of rotation of the drum. The lever carries at its end remote from the fulcrum a pin extending parallel to its fulcrum axis for alternate displacement of a pair of pawl disks (dependent upon the direction of displacement of the lever) which are yieldably held against respective ratchet wheels by a coil spring surrounding a pivot for these disks disposed between the fulcrum axis of the lever and its pin. The disks, which have forwardly bent transverse teeth, may be lifted by the pin to jump one or more teeth of the respective ratchet wheel, whereupon individual spring assemblies urge the disks in the opposite sense to step the wheels and increase the distance between the brakeshoes and the lever in step with the wear of the brake lining.

This individual adjustment of the brakeshoes is independent of force transmission therebetween which is effected via the same assemblies.

The above and other objects, features and advantages of the present invention will become more readily apparent from the following description, reference being made to the accompanying drawings in which:

FIG. 1 is a side view, partly broken away, of an automatic adjusting device for an internal-expansion brake of an automotive vehicle;

FIG. 5 is a diagrammatic elevational view of a brake embodying the present invention.

Figure 2:
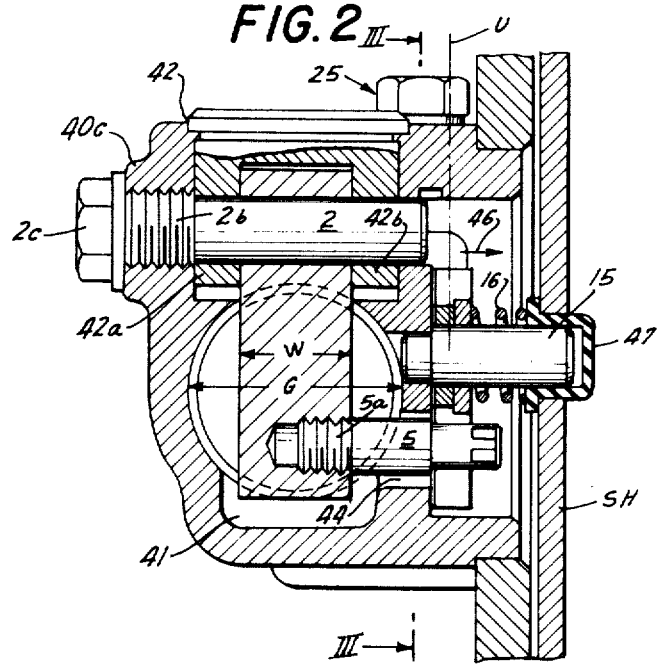
FIG. 2 is a cross-sectional view taken along the line II–II of FIG. 1.

As has been indicated earlier, a duplex-type brake of the internal-expansion configuration comprises a pair of brakeshoes each displaceable by a respective wheel-brake cylinder and operating with a respective abutment so that the sectoral brakeshoes are cammed outwardly in the forward and reverse directions of wheel rotation with force transfer between a primary brakeshoe and a secondary brakeshoe such that the rotary entrainment of the former by the brake drum also applies force to the latter and thereby ensures engagement of the drum by both brakeshoes. A duo-duplex system may provide respective cylinders associated with each of the brakeshoes or merely a pair of pistons shiftable in a single cylinder. From the arrangement of FIG. 5 it can be seen that the brake comprises a rotary drum D whose inner cylindrical surface S forms the rotatable braking face and is engageable by a brake lining L and L′ bonded to the sectoral brakeshoe B and B′. The brakeshoes are of conventional internal-expansion configuration and are drawn inwardly by a pair of tension springs T and T′ against the force of a pair of double-acting wheel-brake cylinders one of which is shown at C. This cylinder has a pair of pistons (cf. U.S. Pat. No. 3,131,787) which act via slotted force-transmitting pins P, P′ upon the reinforcing webs W and W′ of the brakeshoes to urge them outwardly against the rotating brake surface S. At the opposite ends, the shoes B, B′ are in force-transmitting relationship via a wear-compensating device generally designated at WC, whose pins 3 and 4 engage the webs W and W′ as previously indicated. The device WC and the cylinder C are mounted upon the brake shield SH.

In FIGS. 1—3, 4A and 4B, I show the device WC which, in duo-duplex brakes, is disposed between the primary brakeshoe B (when the direction of forward rotation of the drum D corresponds to arrow F and the direction of reverse rotation corresponds to arrow R) and the secondary brakeshoe B′ to shift the latter in response to movement of the former. The force-transmitting device WC comprises a housing structure of arc-segmental configuration (FIG. 1) which is provided with a pivot 2 along its concave side (turned toward the center A of the brake drum D). The housing 40 is provided with a pair of cylindrical extensions 40a and 40b lying in a plane parallel to the plane of the brake shield SH and opening in the direction of the respective brakeshoes B and B′.

These extensions also communicate with a central chamber 41 in which the pivot pin 2 is provided, its threaded boss 2b being received in the front wall 40c of the housing 40 and terminating in a prismatic head 2c by means of which the pin 2 is locked in place. The pin 2 transfixes a cover plug 42 which extends radially into the housing 40 from above and has a pair of aprons 42a and 42b flanking the eye 1a of a force-transmitting lever 1 swivelable about the pivot pin 2 as represented by the arrow 2a. The aprons 42a and 42b thus form a bifurcated positioning member (FIG. 2) retaining the lever 41 between them. The lever 1, which constitutes the force-transmitting member between the pressure pins 3 and 4 and, consequently, between the brakeshoes B and B′ has a width w equal to a major fraction of the diameter d of the bores 3a and 4a of the respective extensions 3 and 4. The lever 1 is substantially dumbbell-shaped with a relatively wide base 1b, a narrow but bulging midsection 1c and the eye 1a mentioned earlier. The lever 1 carries, at its free extremity spaced from the centerline 43 of the housing toward the periphery of the drum D, an entraining pin 5 which projects rearwardly from the lever 1 (FIG. 2) parallel to the pin 2 and has a threaded extremity 5a received in the lever 1 and a free end passing through an arcuate slot 44 of the housing 40.

The pin 5 actuates the automatic adjusting mechanisms which compensate for wear of the brake linings. To this end I provide, in symmetrical relationship about the median plane M through the pivot 2, a pair of generally sectoral disks 8 and 9 whose eyes 8a and 9a are swingably mounted upon a pin 14 and are integral with respective lobes 8b, 9b which together define a radial slot 45 between respective flanks 10 and 11 engageable by diametrical opposite portions of the pin 5 (see FIG. 3). Each of the swingable sectors 8 and 9 is provided with a respective stepping tooth 6 or 7 acting as a pawl designed to step respective ratchet wheels as will be apparent hereinafter. Each of the teeth 6 and 7 is associated with a respective brakeshoe via the adjusting sleeves and bushings of variable effective lengths so that independent compensation of the wear of the brake linings of the respective brakeshoes can be carried out with movement of the lever 1 in the respective direction, the compensation adjustments thus being independent of each other. The undersides 12 and 13 of the pawl teeth 6 and 7 are adapted to engage the ratchet teeth 21 and 31 (FIGS. 4A and 4B).

Pivot 14, upon which the sectors 8 and 9 are swingably mounted, has a axis parallel to the pins 2 and 5 and is disposed substantially midway between them (FIG. 1) and is coplanar with the pin 2. The pin 14 has a shank 15 anchored in the brake shield SH. A compression spring 16 bears axially upon the sectoral pawls 8 and 9 so as to hold them yieldably to the left and permit slight axial deflection as represented in FIG. 4A from the position illustrated in FIG. 4B, this deflection being shown by the arrow 46. At its anchored end, the pin 14, 15 is received in a sleeve 47 preventing entry of contaminants into the adjusting device. The sectors 8 and 9 advantageously extend angularly along an arc segment of 90 to 180°. The sectoral disks 8 and 9 are swingable in a plane perpendicular to the axis of pins 2, 5 and 14, 15 while the teeth 6 and 7 project transversely to this plane which also is generally parallel to the lever 1. The ratchet teeth lie in planes R and R' which are inclined to the median plane M symmetrically and are perpendicular to the plane of swinging movement U (FIG. 2) of the sectors 8 and 9.

Figure 3:
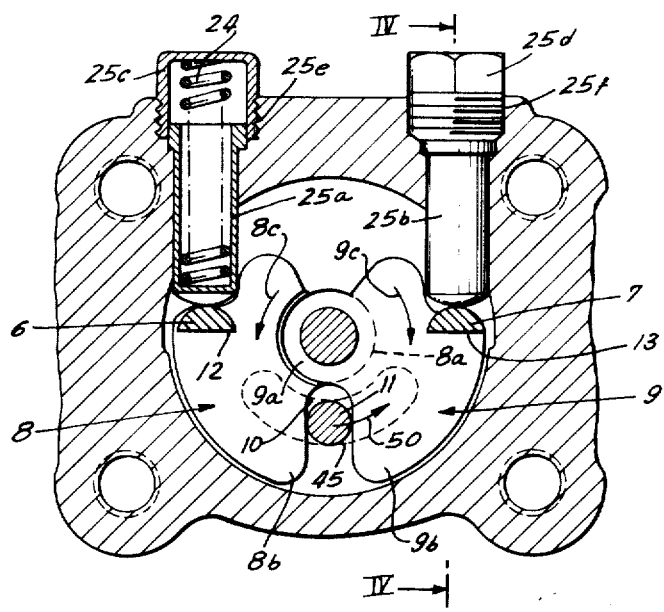
FIG. 3 is a cross-sectional view taken along the line III–III of FIG. 2.
Figure 4A:
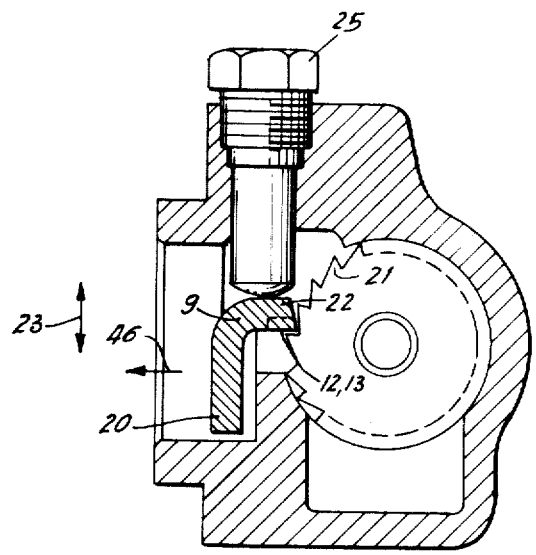
FIG. 4A is a cross-sectional view taken along the line IV–IV of FIG. 3.
Figure 4B:
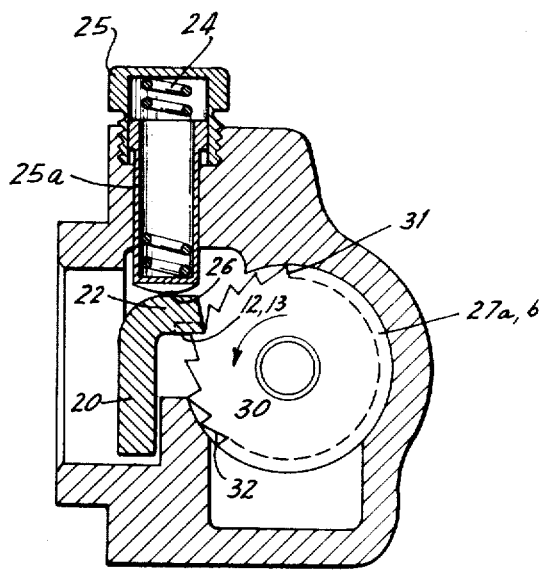
FIG. 4B is a view corresponding to the section of FIG. 4A with the parts in another operative position.

The pawl teeth 6 and 7 are biased respectively in the counterclockwise and clockwise senses (arrows 8c and 9c) by sleeves 25a and 25b telescopingly fitted into caps 25c and 25d the latter being threaded at 25e and 25f into the housing 40 from above to form the biasing spring means 25 (see FIGS. 3 and 4B). The sleeves 25a and 25b receive compression springs 24 which are seated against the caps 25c and 25d and urge the sleeves 25a and 25b against the upper surfaces of the teeth 6 and 7. As can be seen from FIGS. 4A and 4B, each of the pawl teeth 6 and 7 has a shank 20 and is bent at 22 at right angles thereto for engagement with the teeth 21, 31 of the respective ratchet wheels 27a and 27b (see also FIG. 1). The movement of the biasing means and the teeth is represented by arrow 23. The pressure-transmitting members 26 at the ends of the sleeves 25a can be composed of a low friction material (e.g. TEFLON).

The ratchet wheels 27a and 27b of the adjusting mechanisms are formed as ring or crown gears upon respective thimbles 28a and 28b which constitute the drive mechanism for the automatically operable compensating means. The thimbles 28a are fitted into a plunger 28c or 28d which is nonrotatable in the bores 3a and 4a but are axially shiftable therein. The interiors of the sleeves 28c and 28d are formed with internal threads 29a engaging threaded spindles 29 which, in turn, act upon the pressure pins 3 and 4. Members 28a—28d, 29 and 29a of each adjusting device constitute a variable-length ratchet-driven assembly increasing the distance between the inner face 48a and 48b, engageable with the lever 1 and the pins 3 and 4 leading to the brakeshoes.

As is also evident from FIGS. 4A and 4B, the flanks 31 of the teeth 20 are substantially radial while teeth flanks 32 are inclined outwardly along secants of the ratchet wheels 27a, 27b thereby enabling the teeth 6, 7 to jump one or more teeth 21 in conventional ratchet operation to compensate for brake wear.

During normal brake operation, the function of the mechanism can be described as follows: The drum D (FIG. 5) is rotating in the direction of arrow F when the vehicle operator applies foot pressure to the brake pedal which is coupled with the master cylinder and energized the wheel-brake cylinder C. The wheel-brake pistons thereof urge the pins P, P' to the left and right, respectively, thereby urging the upper ends of the brakeshoes B and B' against the braking face S of the drum. The primary brakeshoe B is in part entrained by frictional contact with the surface S and applies, at its lower end, a force generally in the direction of arrow 49 (FIG. 1). The pressure pin 3 drives the spindle 29 in the direction of arrow 49 so that the sleeve 28c is entrained in this direction and applies the transmitted force of the primary brakeshoe to the ratchet wheel 27a and head 48a of the compensating assembly 27a, 28a, 28c, 29 and 48a. The pressure of head 48a drives the lever 1 in the direction of arrow 50 and thus applies to the head 48b a transmitted force in the direction of arrow 51. This axial displacement is transmitted to the sleeve 28d and the pressure transmitting pin 4 which urges the lower end of the secondary brakeshoe B' against the disk. During reverse rotation of the wheel (arrow R) pressure transmission between the brakeshoes occurs in the opposite direction.

When the pin 5 is swung with the lever 1 in the direction of arrow 50, it entrains the sector 9 to lift the ratchet tooth 7 from its original position illustrated in FIG. 4A through one or more teeth (FIG. 4B) against the force of the spring 24 and with slight deflection of the sector 9 in the direction of arrow 46 (FIGS. 2 and 4A). Upon release of the brake pressure, the springs T and T' draw the brakeshoes B, B' inwardly to relieve the force 49, 50, 51, thereby permitting the sleeve 25a (FIG. 4B) to drive the sector 9 in the clockwise sense (FIG. 3) and step the ratchet in the direction of arrow 30 (FIG. 4B). When the brakes are applied during reverse rotation of the drum, the primary brakeshoe B is adjusted in a corresponding manner.

I claim:

1. In an internal-expansion duo-duplex brake having a rotatable brake drum with a generally cylindrical inner brake surface, a pair of generally segmental brakeshoes confronting said drum, actuating means for applying at least one of said brakeshoes against said surface, and force-transmitting means coupling said brakeshoes for urging the other of said brakeshoe against said surface upon the displacement of said one of said brakeshoes thereagainst, the improvement wherein said actuating means includes means between said brakeshoes at one end thereof for spreading said brakeshoes against said surface, and said force-transmitting means includes a pair of pressure members each operatively connected with one of said brakeshoes at the other ends of said brakeshoes and shiftable therewith, a force-transmitting lever swingably mounted between said members and cooperating therewith to transmit force therebetween, said force-transmitting lever being independent of said actuating means, and independently operable wear-compensating assemblies interposed between each of said members and said lever for individually compensating the wear of said brakeshoes, said lever stepping the respective wear-compensating assembly upon swinging movement in a respective sense.

2. In an internal-expansion brake having a rotatable brake drum with a generally cylindrical inner brake surface, a pair of generally segmental brakeshoes confronting said drum, actuating means for applying at least one of said brakeshoes against said surface, and force-transmitting means coupling said brakeshoes for urging the other of said brakeshoe against said surface upon the displacement of said one of said brakeshoes thereagainst, the improvement wherein said force-transmitting means includes a pair of pressure members each operatively connected with one of said brakeshoes and shiftable therewith, a force-transmitting lever swingably mounted between said members and cooperating therewith to transmit force therebetween, and independently operable wear-compensating assemblies interposed between each of said members and said lever for individually compensating the wear of said brakeshoes, said brake having a brake shield extending generally perpendicularly to the axis of rotation of said drum and said force-transmitting means is offset from said axis, said lever extending generally radially with respect to said axis and being provided with a pivot at an end proximal to said axis and a free end remote therefrom, and a pin mounted on said free end and operatively coupleable with said assembly for selectively stepping same in accordance with the direction of movement of said lever.

3. The improvement defined in claim 2 wherein each of said assemblies is provided with a pair of threadedly engageable elements including at least one rotatable element formed with a ratchet wheel, said force-transmitting means further comprising a pair of pawls swingably mounted for movement generally parallel to the movement of said lever and selectively engageable by said pin for stepping the respective ratchet wheels.

4. The improvement defined in claim 3 wherein said pawls are generally sectoral disks swingably mounted for movement about an axis parallel to said pin and the axis of the lever, said force-transmitting means further comprising spring means yieldably urging said disk against one another and in the direction of said ratchet wheels.

5. The improvement defined in claim 4 wherein each of said ratchet wheels is rotatable in a plane perpendicular to the plane of said disks, said disks each having a transverse pawl tooth engaging the ratchet wheels, said force-transmitting means further comprising spring means bearing upon said disks in a direction tending to resist displacement thereof by said pin and adapted to advance the respective ratchet wheels upon release of the respective disk by said pin.

6. The improvement defined in claim 5, further comprising a housing mounted upon said brake shield and formed with a chamber receiving said lever and with a pair of tubular extensions opening in the direction of said brakeshoes, said assemblies each comprising an axially shiftable sleeve received in the respective extension and adapted to transmit force from said members through said sleeves to said lever.

7. The improvement defined in claim 6 wherein said disks are swingable in a plane perpendicular to the plane defined by the fulcrum axis of said lever and axes of said disk.

8. The improvement defined in claim 7 wherein said disks extend over arc segments ranging from 90° to 180° and have flanks engageable with said pin.

9. The improvement defined in claim 8 wherein each of said disks is provided with a respective spring for shifting same upon release by said pin.

10. In an internal-expansion brake having a rotatable brake drum with a generally cylindrical inner brake surface, a pair of generally segmental brakeshoes confronting said drum, actuating means for applying at least one of said brakeshoes against said surface, and force-transmitting means coupling said brakeshoes for urging the other of said brakeshoe against said surface upon the displacement of said one of said brakeshoes thereagainst, the improvement wherein said force-transmitting means includes a pair of pressure members each operatively connected with one of said brakeshoes and shiftable therewith, a force-transmitting lever swingably mounted between said members and cooperating therewith to transmit force there between and independently operable wear-compensating assemblies interposed between each of said members and said lever for individually compensating the wear of said brakeshoes, said force-transmitting means comprising a housing formed with a chamber receiving said lever, said housing being provided with a pair of tubular extensions, each opening at said chamber and in the direction of a respective brakeshoe and slidably receiving the respective assembly, said assemblies each comprising a respective ratchet wheel rotatable in a plane perpendicular to the plane of movement of said lever and to the axis of the respective extension, said lever being provided with a pin extending perpendicularly to the plane of movement of said lever and spaced from its fulcrum axis, pivot means between said fulcrum axis and said pin and generally coplanar therewith in a normal position of said lever, a pair of generally sectoral disks swingably mounted upon said pivot means and symmetrically with respect to the plane defined by said pivot means, said fulcrum axis and said pin while flanking said pin for selective displacement in opposite senses upon corresponding displacement of said lever, said disks each having a transverse tooth engageable with the respective ratchet wheel, first spring means surrounding said pivot means and bearing axially upon said disks to urge them yieldably against said wheels, and second spring means individual to said disks and bearing thereon in the plane of displacement of said disks about said pivot means for resisting entrainment of said disks by said pin.